(12) United States Patent
Wiseman

(10) Patent No.: US 6,198,640 B1
(45) Date of Patent: Mar. 6, 2001

(54) THREE-SWITCH ADD/SUBTRACT DC TO DC CONVERTER

(75) Inventor: Steven L. Wiseman, Redondo Beach, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/586,166

(22) Filed: Jun. 1, 2000

(51) Int. Cl.[7] .................................................. H02M 3/335
(52) U.S. Cl. .............................................. 363/26; 363/134
(58) Field of Search .................................... 363/26, 25, 24, 363/134, 97

(56) References Cited

U.S. PATENT DOCUMENTS 4,943,903   7/1990   Cardwell, Jr. .
5,218,522   6/1993   Phelps et al. .
6,055,162 * 4/2000   Tarrillo et al. ........................ 363/25

* cited by examiner

Primary Examiner—Shawn Riley
(74) Attorney, Agent, or Firm—T. Gudmestad

(57) ABSTRACT

A DC to DC converter that uses three switching devices and processes power in such a way that it can operate very efficiently. The converter only processes that portion of the input power that is required to provide regulation. In addition, by judiciously selecting magnetic components and turns ratios, the converter can be optimized for narrow input voltage ranges or for wide input voltage ranges. The converter operates in such a way that it can add or subtract energy on the primary side of the converter to achieve regulation.

10 Claims, 3 Drawing Sheets

THREE-SWITCH ADD/SUBTRACT DC TO DC CONVERTER

TECHNICAL FIELD

The present invention relates generally to DC to DC converters, and more particularly, to a three-switch add/subtract DC to DC converter.

BACKGROUND ART

Manufacturers of electronic equipment typically include electronic power converters as components of electronic products and systems.

For example, electronic power converters are widely used for battery charging systems, providing regulated DC voltages for computer circuits, and for providing sources of alternating voltage from a source of regulated DC power for motor control applications.

A switching converter can perform several basic functions, one basic function is to operate as a switching DC—DC converter. In a switching DC—DC converter, the DC input voltage is converted to a DC output voltage having a larger or smaller magnitude, with possibly opposite polarity and with the possibility of providing isolation of the input and output ground references.

High efficiency is essential in any power processing application. Low power conversion efficiency results in low component reliability because the components dissipate excessive power. High efficiency is also necessary in applications where limited input power is available.

Power conversion losses in a switching type DC to DC converter are a function of several parameters. Switching type DC to DC converters use switching elements in the process of power conversion. These switching elements dissipate power in the conversion process. Obviously, decreasing the number of required switching elements can reduce the switching losses.

The mass of a switching type DC to DC converter is also related to switching frequency. This is due to the direct relationship between the size of the magnetic components used within the converter and the switching frequency. Higher switching frequency results in a smaller size required for the magnetic components used in the converter. Higher switching frequency can result in a converter with lower mass because the magnetic components can be smaller. Unfortunately, higher switching frequencies result in higher switching losses in the switching elements within switching DC—DC converters. If the number of switches in a converter can be minimized, switching losses can be minimized, and the switching frequency can be increased to achieve a converter with both lower mass and high efficiency.

There is a need for switching DC—DC converter topologies that can minimize the number of switches required and also process power in such a way that high efficiency and low mass can be achieved simultaneously.

SUMMARY OF THE INVENTION

It is, therefore, an object of the invention to provide an improved and reliable DC to DC converter. Another object of the invention is to improve DC to DC converter efficiency, while reducing the number of components required, and the mass of the converter.

In one aspect of the invention, a DC to DC converter includes a first inductor having a first primary circuit with a first terminal and a second terminal and a second primary circuit with a first terminal and a second terminal. The first inductor first primary first terminal is connected to a source of unregulated voltage. The first inductor second primary first terminal is connected to the first inductor first primary circuit first terminal. The DC to DC converter also includes a first transformer having a first primary circuit with a first terminal and a second terminal, and a second primary circuit with a first terminal and a second terminal, and a first secondary circuit with a first terminal and a second terminal. The first transformer first primary circuit first terminal is connected to the first inductor first primary circuit second terminal. The first transformer second primary circuit first terminal is connected to the first inductor second primary circuit second terminal.

The first transformer first primary circuit second terminal is connected to a second transformer first primary circuit first terminal. A first switching device is connected from the second transformer first primary circuit second terminal to ground. A second switching device is connected from the first transformer second primary circuit second terminal to ground.

The second transformer second secondary circuit first terminal is connected to the first inductor first terminal. A control switching device is connected from the second transformer second secondary circuit second terminal to ground.

The second transformer first secondary circuit first terminal is connected to the anode of a current rectifying device, the cathode of the current rectifying device is connected to the first inductor first terminal. The second transformer first secondary circuit second terminal is connected to ground.

The first transformer first secondary circuit terminal one is connected to a rectifying circuit. The first transformer first secondary circuit terminal two is connected to a rectifying circuit. The rectifying circuit is connected to a capacitor. The capacitor has two terminals, the first terminal supplies the regulated output voltage, the second terminal is tied to ground.

A control circuit is connected to the capacitor first terminal. The control circuit controls the frequency, time duration and switching sequence of the first switching device and the second switching device and the control switching device. The control switching device causes only that portion of the input power required to control the voltage at the capacitor terminal one to be added or subtracted from that portion of the input power processed by the first switching device and by the second switching device.

The present invention thus achieves an improved three-switch add/subtract DC to DC converter. The present invention is advantageous in that it converts a first DC voltage to a second DC voltage using less switches and primary rectifying diodes than the current art, which allows the present invention to operate at higher frequencies.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which.

BEST MODES FOR CARRYING OUT THE INVENTION

Figure 1:
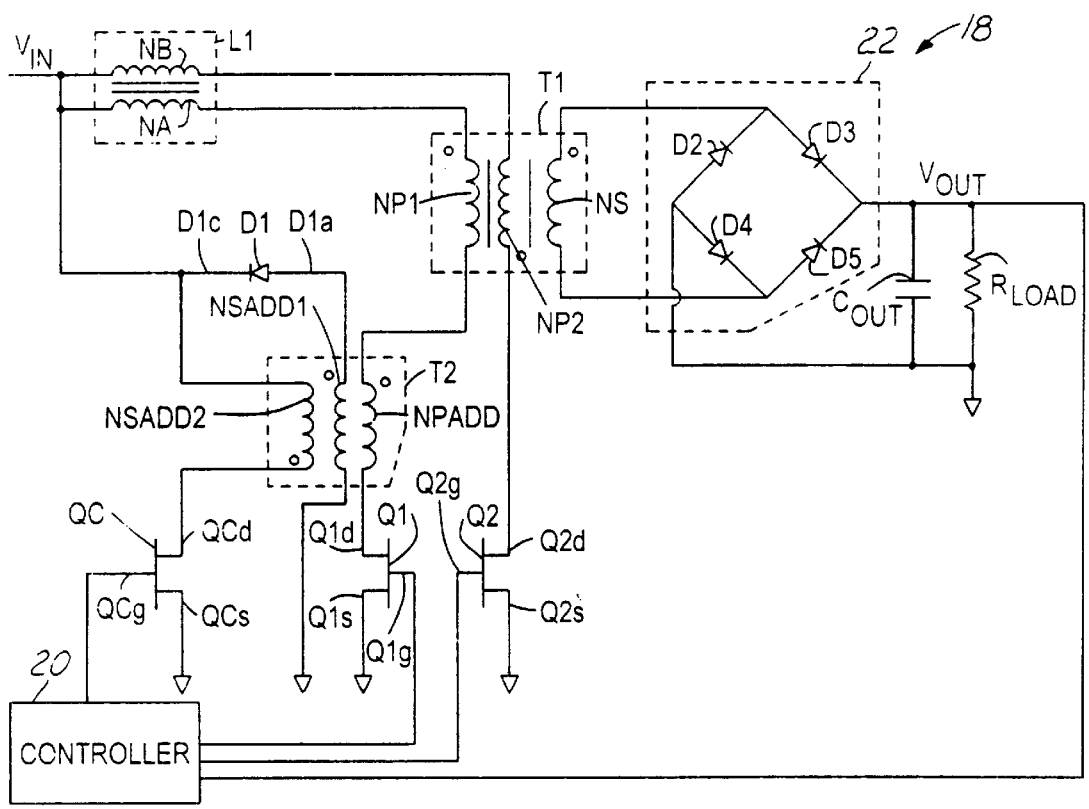
FIG. 1 is a circuit diagram of three-switch add/subtract DC to DC converter according to one embodiment of the present invention.

Referring to FIG. 1, a circuit diagram of a three-switch add/subtract DC to DC converter 18 according to one embodiment of the present invention is illustrated. Converter 18 is a DC to DC converter used to convert an unregulated DC voltage into a regulated DC voltage. DC to DC converter 18 includes an inductor circuit L1, a first transformer T1, a second transformer T2, three switching devices, a primary side rectifier D1, a controller 20, an output rectifier circuit 22, a filter capacitor $C_{OUT}$, and a load resistor $R_{LOAD}$.

Inductor circuit L1 is used to store energy and is connected to an unregulated input voltage $V_{IN}$, and is in series with first transformer T1. In one embodiment of the present invention, inductor circuit L1 includes a first winding NA and a second winding NB that act as current sources for first transformer T1. Inductor L1 winding NA is connected to input voltage $V_{IN}$ and is in series with transformer T1 primary NP1. Inductor L1 winding NB is connected to input voltage VIN and is in series with transformer T1 primary NP2. First transformer T1 primary NP1 is connected between inductor L1 first winding NA and second transformer T2 primary NPADD. Second transformer secondary NSADD1 is connected to ground and to the anode of diode D1a. Diode D1 restricts current flow to one direction. The cathode of D1c is connected to input voltage $V_{IN}$.

The three switching devices include a first switching device Q1, a second switching device Q2, and a control switching device QC. First switching device Q1 includes a first gate Q1g, a first drain Q1d, and a first source Q1s. Second switching device Q2 includes a first gate Q2g, a first drain Q2d, and a first source Q2s.

Control switching device QC includes a first gate QCg, a first drain, QCd, and a first source QCs.

First switching device Q1d is connected to second transformer T2 primary NPADD. First switching device Q1s is connected to ground. First switching device Q1g is connected to controller 20. Second switching device Q2d is connected to first transformer primary NP2. Second switching device Q2s is connected to ground.

Second switching device Q2g is connected to controller 20. Control switching device QCd is connected to second transformer T2 secondary NSADD2. Second transformer T2 secondary NSADD2 is connected to input voltage V1a. Control switching device QCs is connected to ground. Control switching device QCg is connected to controller 20. The controller 20 is also connected to the output voltage $V_{out}$.

The first transformer T1 secondary winding NS is connected to a rectifying circuit consisting of diodes D2, D3, D4 and D5. The rectifying circuit is connected to an energy storage and filter capacitor $C_{OUT}$. Resistor $R_{LOAD}$ represents a variable power-dissipating load for the converter.

Controller 20 is connected to, and controls the switching sequence of first switching device Q1, second switching device Q2, and control-switching device QC.

When control switching device QC is "on" during the "on" time of first switching device Q1 additional voltage is applied across first inductor winding NA. The additional voltage during this time is determined by the input voltage VIN and the ratio of the number of winding turns on T2 transformer NSADD2 to the number of winding turns on T2 transformer NPADD. The additional voltage is equal to $(V_{IN}/NSADD2)*NPADD$. This causes additional energy to be stored in inductor Li during this time. When control switching device QC is "off" during the "on" time of Q1, less voltage is applied across first inductor winding NA. The reduction in voltage during this time is determined by the input voltage VN and the ratio of the number of winding turns on T2 transformer NSADD1 to the number of winding turns on T2 transformer NSADD2.

Figure 2:
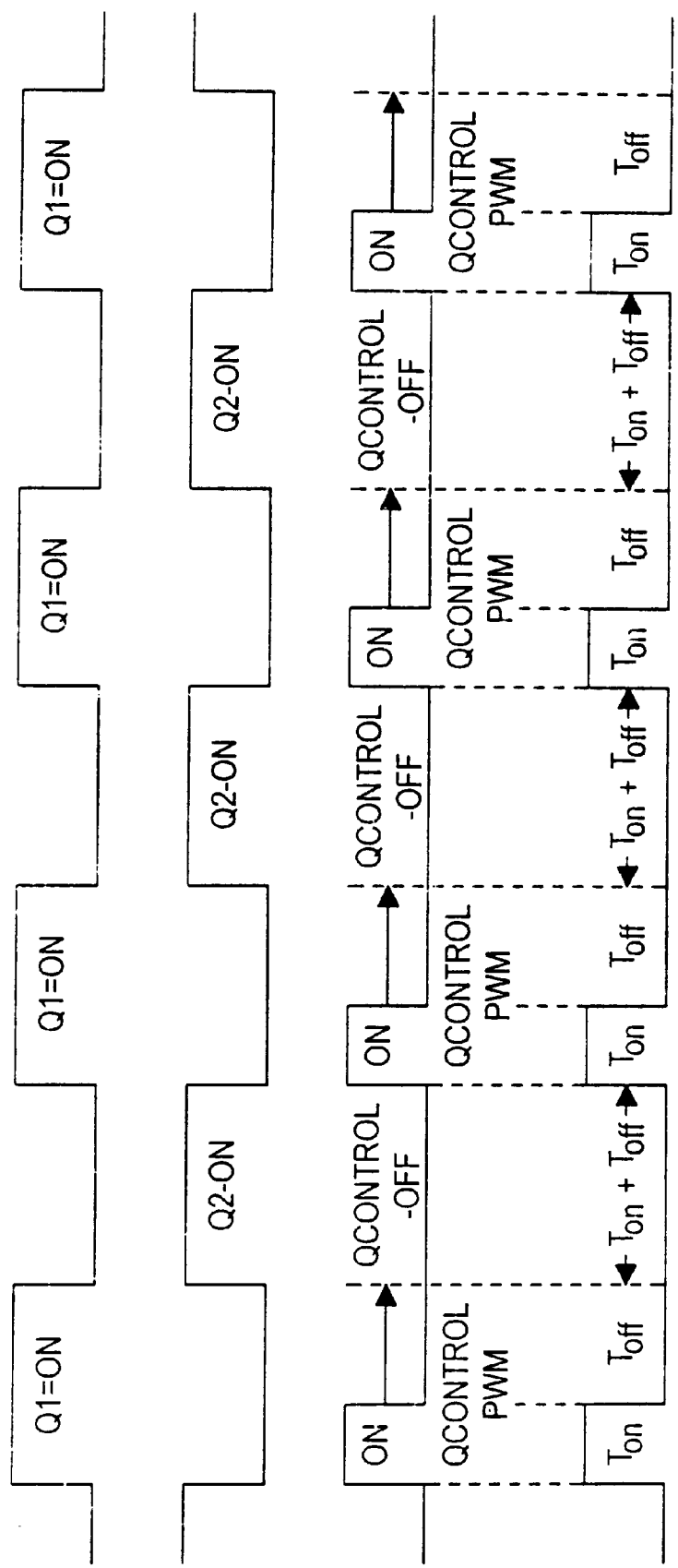
FIG. 2 is a timing diagram depicting a switching sequence according to one embodiment of the present invention.

By defining time intervals in FIG. 2 as shown and then solving the circuit for a volt-second balance on inductor circuit LI during one complete cycle of operation of DC to DC converter 18, duty cycle D can be defined using time on ($T_{on}$) and time off ($T_{off}$), as:

$$D=T_{on}/(T_{on}+T_{off})$$

And $$1-D=T_{off}/(T_{on}+T_{off})$$

Assuming NSADD2=NSADD1, the following relationship between $V_{IN}$ and $V_{OUT}$ can be derived:

$$V_{OUT}=(V_{IN} \cdot NS)(1+(2D-1)(NPADD/NSADD2)+NA/NB)/(NP1+NP2(NA/NB))$$

When the duty cycle D equals zero, then $T_{on}$ equals zero and the add/subtract term is negative and equal to:

$$-NPADD/NSADD2$$

This reduces the output voltage.

When the duty cycle equals one, then the add/subtract term is positive and equal to:

$$+NPADD/NSADD2$$

This increases the output voltage.

As can be seen from the equation describing $V_{OUT}$, there are no duty cycle dependent terms in the denominator, indicating the absence of any right half plane zero in the control to output transfer function.

By examining the denominator from the equation describing $V_{OUT}$, it can be seen that by minimizing the quantity NA/NB, the number of windings on inductor L1 NA winding with respect to the number of windings on inductor L1 NB winding, the denominator of this equation can be minimized.

This results in the variable D (Duty cycle) having more control over $V_{OUT}$ as it changes from 0 to 1. This results in greater input voltage range.

Figure 3:
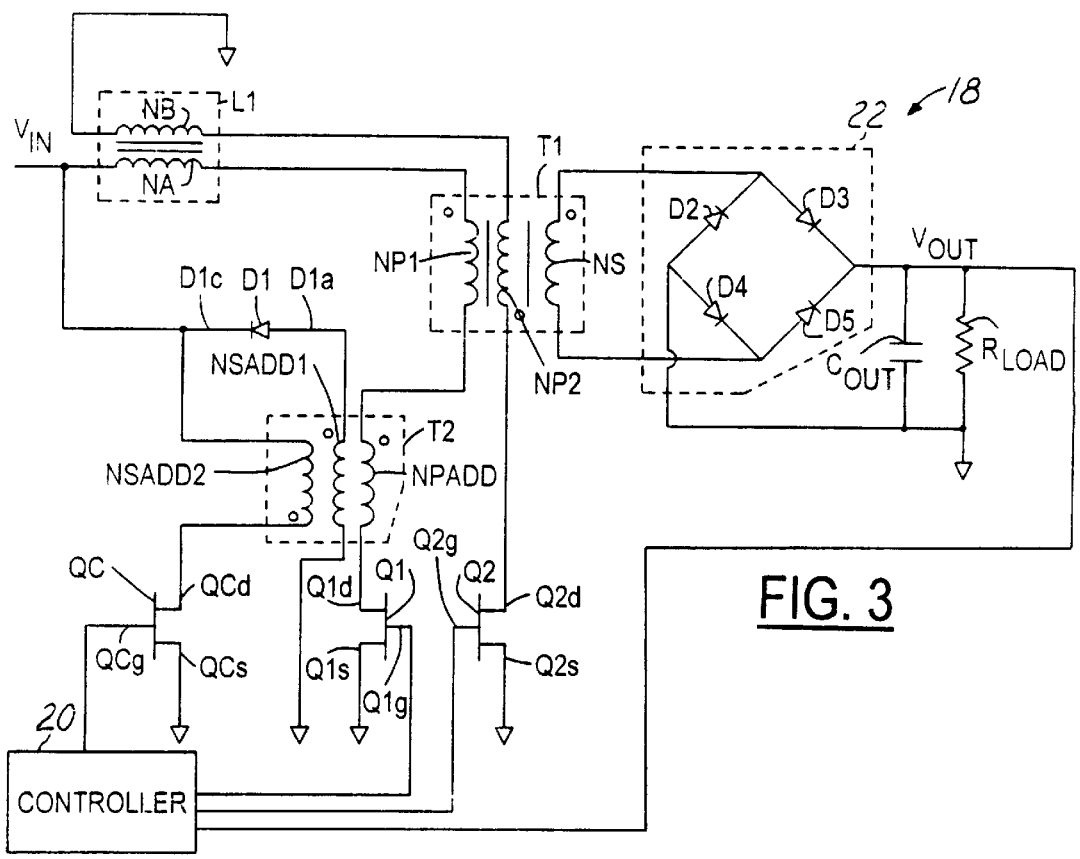
FIG. 3 is a second alternative circuit diagram of three-switch add/subtract DC to DC converter according to one embodiment of the present invention.

Referring to FIG. 3, a second alternative circuit diagram of three-switch add/subtract DC to DC converter 18' according to one embodiment of the present invention is illustrated. In this alternative embodiment, second inductor NB of inductive circuit L1 is coupled to the return path instead of to input voltage $V_{IN}$. In this case, $$V_{OUT}=V_{IN} \cdot NS(1+(2D-1)NPADD/NSADD2)/(NP1+NP2(NA/NB))$$

As can be seen from this equation, there are no duty cycle dependent terms in the denominator indicating the absence of any right half plane zero in the control to output transfer function.

Figure 4:
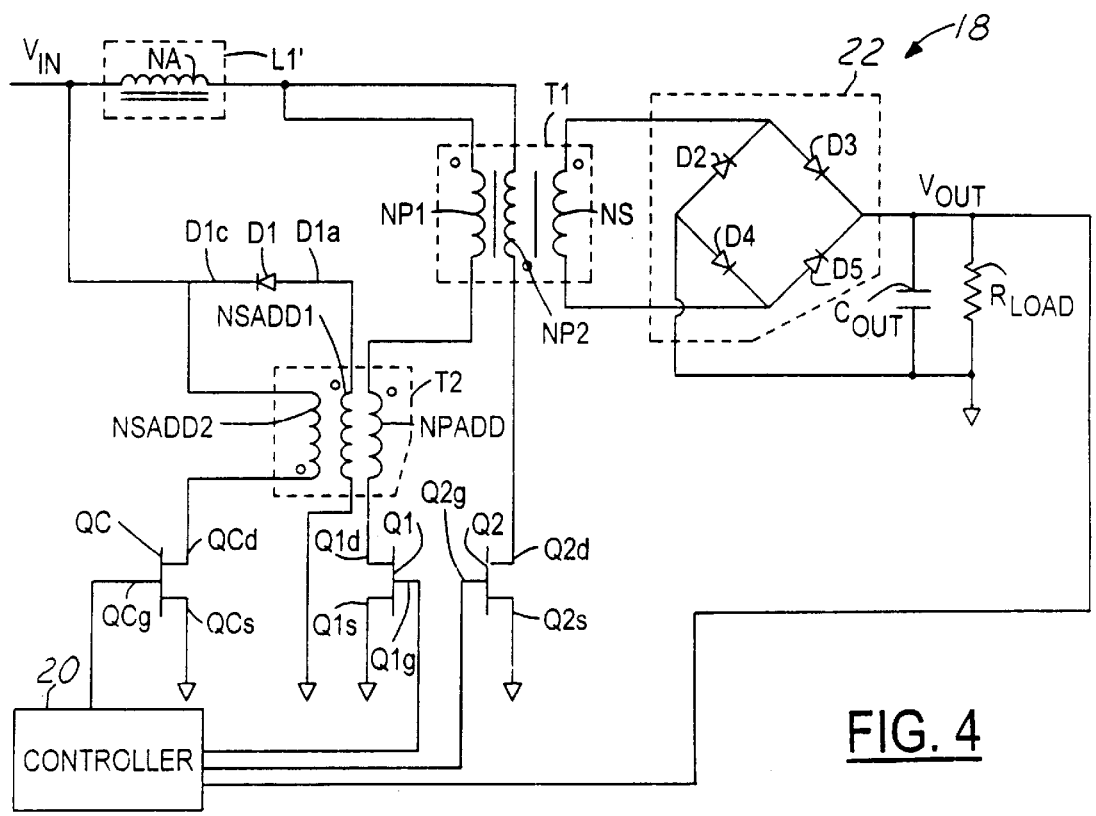
FIG. 4 is a third alternative circuit diagram of three-switch add/subtract DC to DC converter according to one embodiment of the present invention.

Referring to FIG. 4, a third alternative circuit diagram of three-switch add/subtract DC to DC converter 18" according to one embodiment of the present invention is illustrated. In this alternative embodiment, inductor circuit L1' includes only first inductor NA. In this case, $$V_{OUT}=V_{IN} \cdot NS((2+(2D-1)NPADD/NSADD2)/(NP+NP2))$$

As can be seen from this equation, there are no duty cycle dependent terms in the denominator indicating the absence of any right half plane zero in the control to output transfer function.

From the foregoing, it can be seen that there has been brought to the art a new and improved three-switch add/subtract DC to DC converter. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims:

What is claimed is:

1. A DC to DC converter, comprising:
   a first transformer having a first primary circuit and a secondary primary circuit and a first secondary circuit, said first secondary circuit coupled to a load;
   a input voltage source coupled to said first primary circuit via an inductor circuit having a first winding and a second winding, so that said first transformer is driven by a current source;
   a second transformer having a first primary circuit and a first secondary circuit, and a second secondary circuit, said first primary circuit connected in series with said first transformer first primary circuit, said first secondary circuit connected in series with the anode of a diode rectifier and the diode rectifier cathode connected to said input voltage and said first secondary circuit also connected to a return path and said second secondary connected to said input voltage;
   a first switching device coupled to said return path wherein said first switching device is coupled in series with said second transformer first primary circuit;
   a second switching device coupled to said return path wherein said second switching device is coupled in series with said first transformer second primary circuit;
   a control switching device coupled to said return path wherein said control switching device is coupled in series with said second transformer second secondary circuit; and
   a controller coupled to said control switching device, said first switching device, said second switching device, and said load, for periodically connecting said return path to said second transformer first primary circuit, and for periodically connecting said return path to said first transformer second primary circuit, and for periodically connecting said return path to said second transformer second secondary circuit.

2. A DC to DC converter as recited in claim 1 wherein said first transformer circuit comprises a first primary winding, a second primary winding and a first secondary winding.

3. A DC to DC converter as recited in claim 2 wherein said first transformer first primary winding and said first transformer second primary winding having a center tap.

4. A DC to DC converter as recited in claim 1 wherein a full wave diode-bridge rectifier is coupled between said first transformer first secondary circuit and said load.

5. A DC to DC converter as recited in claim 4 wherein an output capacitor is coupled between said full wave diode-bridge rectifier and said load.

6. A DC to DC converter as recited in claim 1 wherein said inductor circuit comprises a first inductor.

7. A DC to DC converter as recited in claim 6 wherein said inductor circuit comprises a second inductor coupled in parallel with said first inductor.

8. A DC to DC converter as recited in claim 7 wherein said second inductor is coupled to said return path.

9. A DC to DC converter as recited in claim 1 wherein said second transformer circuit comprises a first primary winding, a first secondary winding, and a second secondary winding.

10. A method of converting a first DC voltage to a second DC voltage comprising the steps of:
    activating a first switching device, whereby said first switching device couples a return path to a second transformer first primary circuit;
    deactivating a second switching device in response to said activation of said first switching device, whereby said second switching device decouples said return path from a first transformer second primary circuit;
    deactivating said first switching device, whereby said first switching device decouples said return path from said second transformer first primary circuit;
    activating a second switching device in response to said deactivation of said first switching device, whereby said second switching device couples said return path to said first transformer second primary circuit;
    pulse width modulating a control switching device, whereby said control switching device couples said return path to a second transformer second secondary circuit; and
    controlling said pulse width in response to an output voltage.

* * * * *